United States Patent [19]

Warnock et al.

[11] 4,291,333

[45] Sep. 22, 1981

[54] NOISE FILTER

[75] Inventors: Richard B. Warnock, Bountiful; John A. Briggs, Midvale, both of Utah

[73] Assignee: Fernseh Inc., Salt Lake City, Utah

[21] Appl. No.: 148,437

[22] Filed: May 9, 1980

Related U.S. Application Data

[63] Continuation-in-part of Ser. No. 41,455, May 22, 1979, abandoned.

[51] Int. Cl.$^3$ ............................................ H04N 9/535
[52] U.S. Cl. .................................... 358/36; 358/167
[58] Field of Search ............... 358/21 R, 36, 37, 167, 358/181

[56] References Cited

U.S. PATENT DOCUMENTS

| | | | |
|---|---|---|---|
| 3,978,409 | 8/1976 | Dolby | 358/36 |
| 4,058,836 | 11/1977 | Drewery | 358/36 |
| 4,064,530 | 12/1977 | Kaiser | 358/36 |
| 4,107,739 | 8/1978 | Rossi | 358/36 |
| 4,163,249 | 7/1979 | Michael | 358/21 R |

OTHER PUBLICATIONS

"Theoretical Improvement in Signal to Noise Ratio of Television Signals by Equivalent Comb Filter Technique" Stateman, et al., Date & Publication Data Unknown.

"Digital Recursive Filter" IBM Tech. Disc. Bulletin vol. 14 #10 Mar. 1972 Abensour.

*Primary Examiner*—Marc E. Bookbinder
*Assistant Examiner*—Michael A. Masinick
*Attorney, Agent, or Firm*—John H. Moore; Roger M. Fitz-Gerald

[57] ABSTRACT

A recursive digital filter is disclosed for removing noise from an incoming television signal. The filter couples the incoming television signal to a subtracter without substantial attenuation of the television signal. The subtracter also receives at an input an attenuated difference signal comprising a selected amplitude of the difference between the incoming signal and an earlier received signal which has been delayed for an interval corresponding to one television frame. The subtracter subtracts the attenuated difference signal from the incoming signal and develops an output in which noise is substantially reduced.

14 Claims, 9 Drawing Figures

NOISE FILTER

CROSS REFERENCE TO RELATED APPLICATION

This application is a continuation-in-part of application Ser. No. 041,455, filed May 22, 1979, now abandoned.

BACKGROUND OF THE INVENTION

This invention is directed generally to noise filters, and particularly to digital filters for reducing noise in television signals.

It is well known in the art that so-called "recursive" filters are well suited for removing noise from repetitive signals such as television signals whose information content does not ordinarily vary to a great extent from frame to frame. One proposal for such a noise filter is disclosed in U.S. Pat. No. 4,064,530.

In the above-mentioned patent, a summer is employed to receive and sum an incoming digitized television signal and an earlier received television signal which has been delayed for an interval corresponding to one television frame period. The output of the summer provides a noise reduced television signal and also provides the input to a one frame delay device, the output of the latter providing one input to the summer.

In order to reduce smearing which can result from such recursive filtering when motion is present in the television signal, the filter described in the above-mentioned patent employs two attenuators, one between the incoming television signal and its input to the summer, and another between the output of the one frame delay device and its input to the summer. The two attenuators are adjusted simultaneously as a function of detected motion in the television signal and such that their combined outputs are equal to unity.

The above-described filter suffers from the fact that a rather expensive system is required to include two attentuators. In addition, a mis-adjustment to either of the attenuators may result in noticeable distortion in the output of the filter. Hence, prior recursive filters for use with television signals and the like have not been entirely satisfactory.

Another problem associated with filters used to reduce noise in NTSC television signals has to do with the fact that the chroma component of the television signal undergoes a 180° phase reversal for each television line. Because there are an odd number of television lines in one television frame, the summation of an incoming television signal with a frame-delayed television signal can result in cancellation of the chroma component in the summed signal. To avoid such cancellation, it has been proposed to invert only the chroma component of the frame-delayed television signal prior to summing it with the incoming signal. While such chroma inversion tends to solve the problem of chroma cancellation, prior attempts to achieve such inversion, particularly utilizing a digitized television signal, have not been entirely satisfactory.

OBJECTS OF THE INVENTION

It is a general object of the invention to provide an improved filter for reducing noise in repetitive signals such as television signals.

It is a more specific object of the invention to provide a recursive noise filter for use with television signals which is less expensive than such prior filters.

It is another object of the invention to provide a recursive noise filter which eliminates one of the attenuators found in prior recursive filters.

It is a further object of the invention to provide an improved chroma inverter for use with a filter which reduces noise from a television signal.

BRIEF DESCRIPTION OF THE FIGURES

The objects stated above and other objects of the invention are more particularly set forth in the following detailed description and in the accompanying drawings of which.

SUMMARY OF THE INVENTION

The noise filter according to the invention includes subtracting means having a pair of inputs and an output. One of the inputs receives an unattenuated incoming television signal which may include noise. The output of the subtracting means is coupled to a delay means for storing the output of the subtracting means for a selected multiple of a television field interval, such as for one frame. The delayed signal is applied to a motion detector which also receives the incoming television signal. The motion detector develops a difference signal representative of the differences between its two inputs. An attenuator receives the difference signal, attenuates it as a function of the amount of motion in the scene, and applies the attenutated difference signal to the other input of the subtracting means. By this arrangement, the output of the subtracting means is a television signal in which noise has been substantially reduced.

DESCRIPTION OF THE PREFERRED EMBODIMENT

Figure 1:
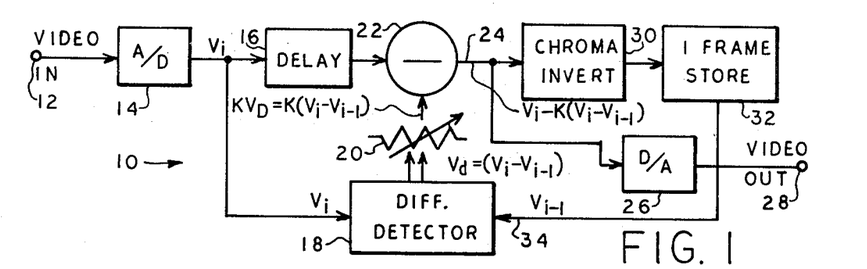
FIG. 1 illustrates a noise filter according to the invention in a general, block diagram form.

Referring now to FIG. 1, there is shown in block diagram form a noise filter 10 for filtering noise from a television having a chroma component. In the illustrated embodiment, incoming video, such as that associated with an incoming television signal, is applied at an input terminal 12. The incoming signal is coupled from the terminal 12 to a conventional analog-to-digital (A/D) converter 14 for digitizing the incoming signal.

The output of the A/D converter 14 is referred to herein as $V_i$ which constitutes the input to the filter 10.

The signal $V_i$ is applied to a delay device 16 and to one of two inputs of a motion detector, illustrated as a difference detector 18.

The other input to the difference detector 18 is a television signal which has been delayed by a multiple of a television field interval, designated herein as $V_{i-1}$. The difference detector 18 examines the differences between its two inputs to develop a difference signal $V_d$ representative of the difference between $V_1$ and $V_{i-1}$. When there is a great deal of motion in the scene conveyed by the television signal, $V_d$ will be large. Lesser motion in the scene results in a corresponding smaller amplitude for $V_d$.

The output $V_d$ of the motion detector is coupled to an attenuator shown schematically as a variable resistor 20. The function of the attenuator 20 is to attenuate the difference signal $V_d$ as a function of the amount of detected motion in the scene. Hence, the attenuated signal, $KV_d$, where K is an attenuating factor, is developed as an output of the variable resistor 20 and is applied to one input of a subtracter 22. The other input $V_i$ to the subtracter 22 is received from the delay device 16, the latter of which may supply a small delay included to compensate for other delays in the system so that the subtracter 22 receives both its inputs simultaneously. Hence, the subtracter 22 develops at its output 24 a signal representing the difference between the incoming television signal and the attenuated difference signal, represented as $V_i - K(V_i - V_{i-1})$. The latter signal represents the noise reduced signal which is applied to a conventional digital-to-analog (D/A) converter 26 for generating an analog video output at terminal 28.

The signal $V_{i-1}$ is developed in the illustrated embodiment by coupling the output of the subtracter 22 through a chroma inverter 30 and a one frame store 32, and thence to an input 34 of the difference detector 18. The function of the combination of the chroma inverter 30 and the one frame store 32 is to invert only the chroma component of the signal output from the subtracter 22 and to delay the chroma and luminance components by an interval corresponding to one television frame period. Hence, the delayed signal $V_{i-1}$ has a chroma component of the proper phase for comparison with the imcoming signal $V_i$.

Although the illustrated embodiment preferably employs a one frame store 32, corresponding to a delay of two television fields, other multiples of a television field may also be employed for delaying the signal from the subtracter 22.

By virtue of the recursive filtering action of the noise filter 10, spurious noise associated with the input signal $V_i$ is substantially reduced in the output signal at terminal 28. When there is a large amount of motion in the television scene and $V_d$ becomes correspondingly large, the factor K may be reduced to zero to avoid smearing. As a result, the signal at output terminal 28 corresponds to the input signal $V_i$. When there is no motion in the television scene, the variable resistor 20 is automatically adjusted so that the factor K is nearly equal to 1. In the latter case, the video output signal at terminal 28 is composed of a large fraction of $V_d$ and a small fraction of $V_1$. Thus, any noise present in $V_i$ is substantially removed from the video output signal.

At intermediate amplitudes of $V_d$ (a small amount of motion in the television scene), the variable resistor 20 is automatically adjusted to an intermediate value so that the video output signal comprises intermediate values of the incoming signal $V_i$ and the difference signal $V_d$.

It will be appreciated that the noise filter 10 is more economical than prior filters employing two attenuators. Moreover, the present filter need not take into account the possibility of a mis-adjustment to one of a pair of attenuators, which mis-adjustment may result in distortion in the video output signal. Further, the present noise filter provides noise reduction of substantially the same degree as prior filters requiring multiple attenuators.

Throughout the various figures, similar elements are identified by the same reference numerals. Also, commercial identifying numbers are shown for various circuit elements.

Figure 2:
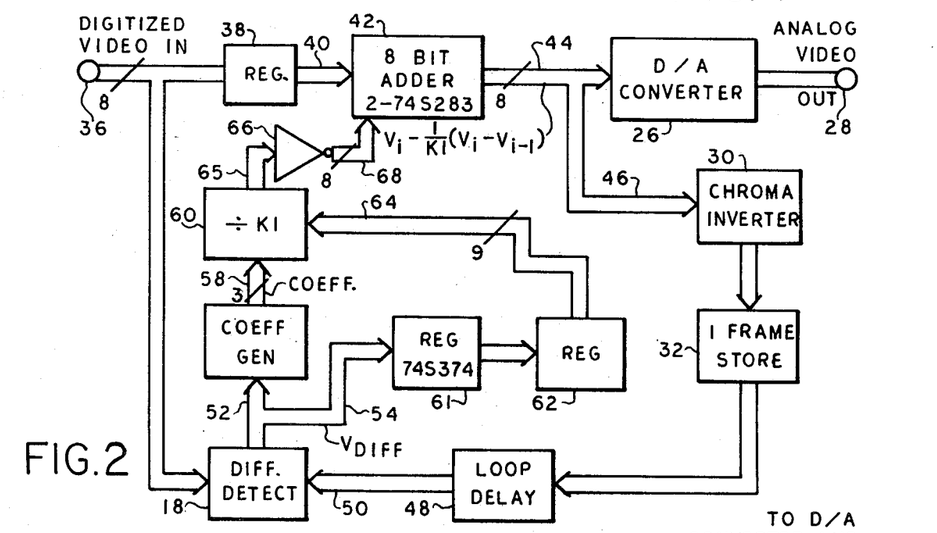
FIG. 2 is a more detailed illustration of the FIG. 1 embodiment, showing in particular more detailed structure of the attenuator and subtracter of FIG. 1.

Referring now to FIG. 2, more detail is shown of a preferred structure for selectively attenuating the difference signal $V_d$. In this embodiment, the incoming signal $V_i$ from the A/D converter 14 (FIG. 1) is received via a bus 36. As indicated by the slash through the bus 36 and the numeral 8 adjacent to the slash, the incoming signal $V_i$ is in the form of 8 bits of digital information. The bus 36 couples the incoming signal to the difference detector 18 and to a register 38, the latter of which latches $V_i$ for a short interval and provides the delay indicated by delay device 16 in FIG. 1.

The output of the register 38 is coupled via a bus 40 to the input of an eight bit adder 42, the output of which on bus 44 corresponds to the output 24 of the subtracter 22 in FIG. 1. However, in FIG. 2, this output is designated as $V_i - (1/K1)(V_i - V_{i-1})$ because of the way the difference signal is attenuated by the embodiment of FIG. 2. It will be appreciated, however, that the "K" of FIG. 1 corresponds to the "1/K1" of FIG. 2.

The noise reduced signal on the bus 44 is coupled to the D/A converter 26 and thence to the output terminal 28 and, via a bus 46, through the chroma inverter 30 and the one frame store 32 to a loop delay 48. The loop delay 48 may include one or more registers or latches to provide a small amount of further delay to the delayed signal to ensure that the latter signal, which is applied via bus 50 to the difference detector 18, arrives simultaneously with the incoming signal $V_i$.

The difference detector 18 provides two outputs, one on a bus 52 and another on a bus 54. The signal on the bus 52 is an eight bit signal representative of the absolute value of the difference signal $V_d$, i.e., the absolute value of the difference between $V_i$ and $V_{i-1}$. A coefficient generator 56 is responsive to the signal on bus 52 for generating at bus 58 a three bit coefficient whose value is a function of the value of the signal on the bus 52. That coefficient is applied to a divide-by-K1 divider 60 for dividing the difference signal by a factor determined by the value of the coefficient on the bus 58.

The difference signal $V_d$ on the bus 54 is a nine bit signal with eight bits of resolution and one bit representative of the sign of $V_d$. That signal is applied to a serially coupled pair of registers 61 and 62 to provide a small amount of delay for the signal $V_d$. Each of the registers 61 and 62 (and the other illustrated registers) may be of the type designed commercially as a Texas instrument Ser. No. 74S374.

The output of the register 62 is applied via a bus 64 to an input of the divider 60, the latter of which divides the signal received on the bus 64 by a factor K1 which is determined by the coefficient received on the bus 58.

The output of the divider 60 is coupled via a bus 65 to an input of a one's complement generator 66. As will be evident to those skilled in the art, the generator 66 exchanges each binary one of its input signal for a binary zero and vice versa.

The output of the generator 66 is coupled via a bus 68 to an input of the adder 42. The latter may include two four bit 74S283 adders coupled together by a "carry" line, one of the four bit adders receiving the four least significant bits of the signals on busses 40 and 68 and the other of the four bit adders receiving the four most significant bits of the same signals. The carry input of the least significant four bit adder is tied to a positive voltage source which, together with the one's complement input, causes the adder to perform subtraction.

By the illustrated combination of the generator 66, the divider 60 and the adder 42, the attenuated difference signal is, in effect, subtracted from the incoming signal $V_i$. It will be appreciated that other combinations of circuit elements may be employed to effect the subtraction function of the subtracter 22 of FIG. 1.

Figure 3:
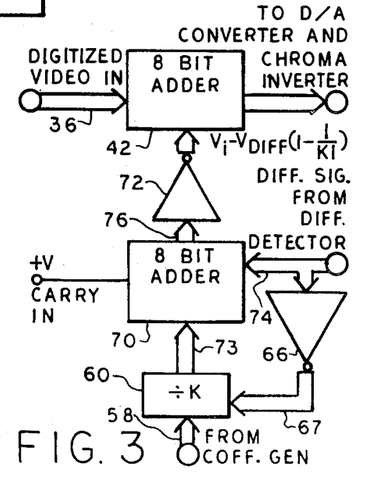
FIG. 3 illustrates an alternate structure for effecting the subtraction function of FIG. 1.

Another structure which has been found suitable for subtracting the attenuated difference signal from the incoming signal is shown in FIG. 3, which, in addition to the eight bit adder 42 and the one's complement generator 66 of FIG. 2, includes another eight bit adder 70 and another one's complement generator 72. In this embodiment, the divider 60 receives a three bit coefficient via the bus 58 and the one's complement of the difference signal via the bus 67. The output of the divider 60 is applied to the additional 8 bit adder 70 via a bus 73 whose "carry in" terminal is coupled to a positive source of voltage. The adder 70 also receives the difference signal from the difference detector 18 via a bus 74. Hence, the 8 bit adder 70 operates to subtract the signal on the bus 73 from the signal on the bus 74 to develop an output corresponding to $V_d(1-1/K1)$ at the bus 76. The output of the adder 70 is applied to the one's complement generator 72 whose output is coupled to the eight bit adder 42. Therefore, the output of the adder 42 corresponds to $V_i-V_d(1-1/K1)$ and is coupled to the D/A converter 26 and to the chroma converter 30 as indicated in FIG. 2.

Although the output of the adder 42 in the embodiment of FIG. 3 differs somewhat from the output of the adder 42 in the embodiment of FIG. 2, both such outputs are very similar with respect to the reduction of noise. Moreover, both essentially provide the functions effected by the structure of FIG. 1. Accordingly, where the reference is made herein to subtracting an attenuated difference signal from an unattenuated incoming signal (as shown generally in FIG. 1) it is meant to include either of the structures shown in FIGS. 2 and 3.

Figure 4:
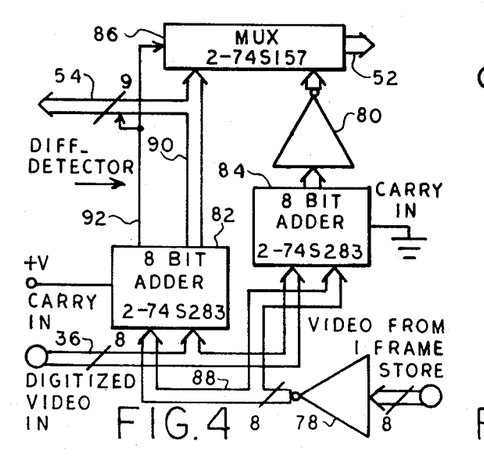
FIG. 4 depicts details of a preferred form of difference detector for use with the noise filter of FIGS. 1 and 2.

Referring to FIG. 4, there is shown an illustrative embodiment of the difference detector 18. As shown, the difference detector may include a pair of one's complement generators 78 and 80, each of which may include eight 74S04 inverters, one for each of the eight bits of data they receive. The illustrated embodiment also includes a pair of eight bit adders 82, 84 and a multiplexer 86. In the illustrated arrangement, the generator 78 receives an eight bit signal corresponding to $V_{i-1}$ from the one frame store 32 and supplies its complemented output via a bus 88 to the adder 82 and a similar signal to an input of the adder 84. The latter also receives the digitized signal $V_i$ on bus 36. The "carry in" terminal of the adder 84 is grounded and its output is coupled to the one's complement generator 80, wherefore the output of the generator 80 is a positive eight bit number representing the negative difference between $V_i$ and $V_{i-1}$. That eight bit number is applied as an input to the multiplexer 86.

The other adder 82 receives $V_i$ from bus 36 and also the output of the generator 78. With the "carry in" terminal of the adder 82 returned to a positive potential as shown, its output at bus 90 is an eight bit positive number representative of the positive difference between $V_i$ and $V_{i-1}$.

The bit containing the sign of the output of the adder 62 is coupled via a line 92 to the multiplexer 86 to indicate to the latter which of its inputs to switch to the bus 52 for delivery to the coefficient generator 56. Hence, the signal on bus 52 corresponds to the absolute value of the difference between the incoming signal $V_i$ and the frame-delayed signal $V_{i-1}$.

The other ouput from the difference detector is at bus 54 which receives the eight bit signal on the bus 90 and the sign bit on the line 92, thereby providing a nine bit signal (8 bits of resolution plus sign) to the register 61 of FIG. 2.

Figure 5:
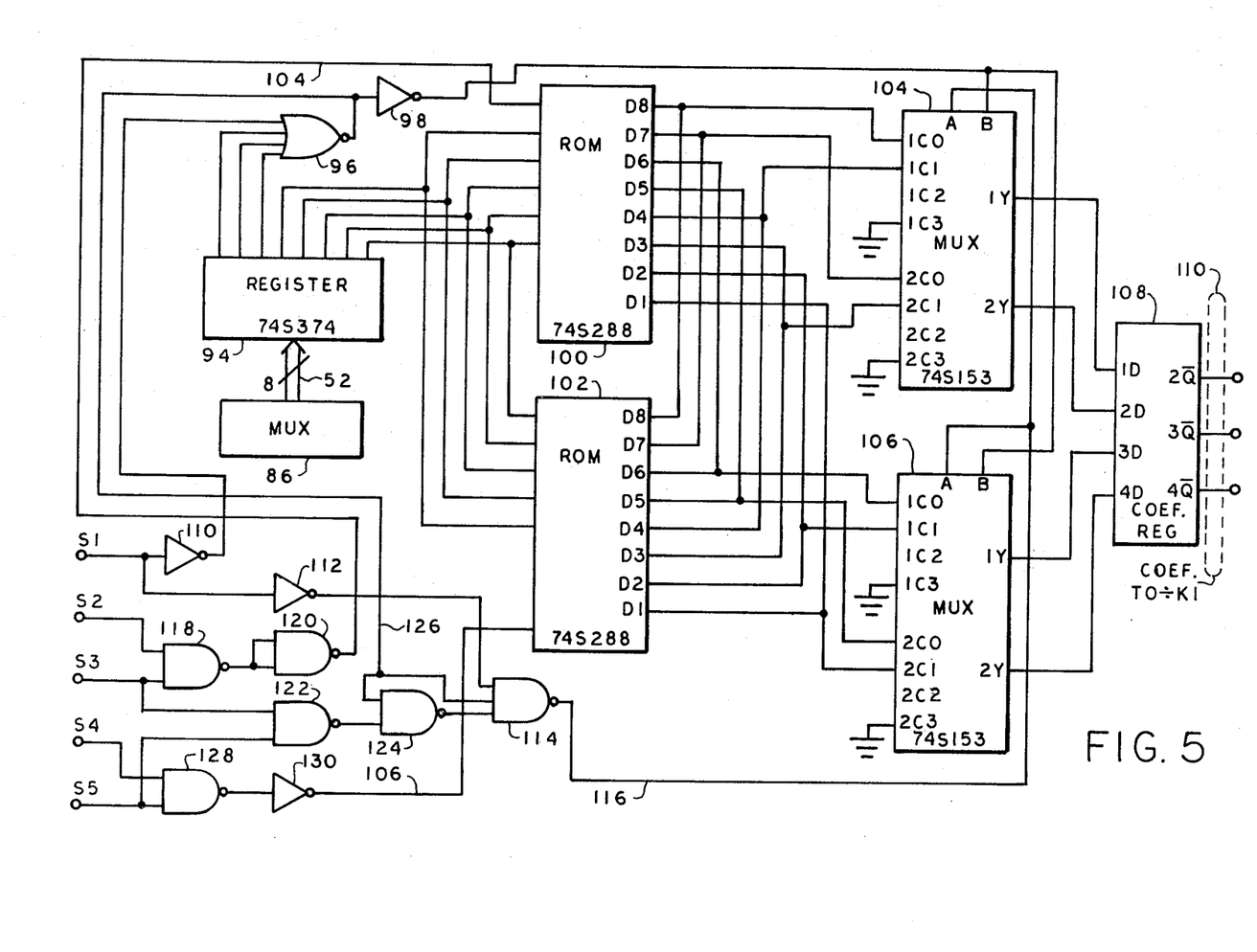
FIG. 5 depicts a preferred form of a coefficient generator for use with the noise filter of FIG. 2.

Referring now to FIG. 5, there is shown detailed circuitry for implementing the coefficient generator 56. As shown, the multiplexer 86 delivers an eight bit signal representative of the absolute value of the difference signal to a register 94 via the bus 52. When the register 94 is clocked (clocking circuitry and connections therefor are conventional and are not shown), the three most significant bits of the difference signal are coupled to a NOR gate 96 whose output is coupled to an inverter 98. The NOR gate 96 and the inverter 98 constitute threshold decision logic to determine whether the motion in the scene is so large that it is desirable to pass the input signal $V_i$ straight through to the D/A converter 26 without subtracting the difference signal from it. When such a large amount of motion is detected, a coefficient is selected such that the amplitude of the difference signal received by the subtracter 22 (FIG. 1) is zero.

The five least significant bits from the register 94 are coupled to a pair of read only memories (ROMs) 100 and 102 for addressing different locations in memory thereof. At the various memory locations, the ROMs 100 and 102 are multi-bit signals which are selectable to generate a particular coefficient. The multi-bit signals which are selected depend on the state of the inverter 98 and upon the levels of the voltages on switch contacts S1-S5. The latter contacts are coupled to two-position operator actuable switches which permit an operator to vary the coefficients to produce the most desirable output signal, as viewed, for example, on a television monitor. Suffice it to say at this juncture that only one of the ROMs is enabled at a time. Specifically, the ROM 100 is enabled by a signal on a line 104 and the ROM 102 is enabled by a signal on a line 106.

The outputs D1-D8 of the ROM 100 are connected to corresponding outputs of the ROM 102 as shown. Half of those outputs provide inputs to a dual 4 to 1 multiplexer 104 and the other half provide inputs to another dual 4 to 1 multiplexer 106. Specifically, the D3, D4, D7 and D8 outputs of the ROMs are connected to the 2C1, 1C1, 2C0 and 1C0 inputs, resepectively, of the multiplexer 104. The D1, D2, D5 and D6 outputs of the ROMs are connected to the 2C1, 1C1, 2C0 and 1C0 inputs, respectively, of the multiplexer 106. Each of the multiplexers 104 and 106 have A and B terminals as shown so that in response to their A and B inputs, the multiplexers switch one of the 1C0-1C3 inputs to their 1Y output and one of their 2C0-2C3 inputs to their 2Y output. Hence, a selectable combination of ROM outputs are switchable to the 1Y and 2Y outputs for generating a particular coefficient. The 1Y and 2Y outputs of the multiplexers are, in turn, coupled to the inputs 1D-4D of a coefficient register 108. The output of the register 108 at terminals 110 is a three bit coefficient which is coupled to the divider 60 for attenuating the difference signal.

Referring again to the NOR gate 96, when one of its inputs is high, its output goes low, the output of the inverter 98 goes high, and the B inputs of the multiplexers 104 and 106 go high. This sequence of events occurs when one of the three most significant output bits of the register 94 is high or when the contact S1 receives a low voltage.

The A inputs of the multiplexers 104 and 106 are controlled by the switching combinational logic comprising switch contacts S1-S5 and the illustrated gates to which they are connected. Specifically, the contact S1 is coupled through an inverter 110 to one input of the NOR gate 96, and through an inverter 112 to one input of a NAND gate 114. The output of the NAND gate 114 is coupled via line 116 to the A inputs of the multiplexers 104 and 106.

The switch contact S2 is coupled to one or two inputs to a NAND gate 118, the output of which provides both inputs to a NAND gate 120. The lead 104 connects the output of the gate 120 to the enable input of the ROM 100.

The contact S3 is coupled to the other input of the gate 118 and to one of two inputs of a NAND gate 122 which drives one input of a NAND gate 124. The other input of the gate 124 receives the output of the NOR gate 96 via line 126. Line 126 also provides one input to the NAND gate 114.

The contact S4 is connected directly to an input of NAND gate 128, the output of which is coupled to an inverter 130. The output of the inverter 130 is coupled to the enable input of the ROM 102 via line 106. The contact S5 is connected to the other input of NAND gate 128 and also to the other input of NAND gate 122.

It is apparent that whatever coefficient is selected to appear at the output terminals 110 depends on the voltage levels at contacts S1-S5, the absolute value of the difference signal as represented by the outputs of the register 94, and the multi-bit signals stored in the ROMs 100 and 102. Such selection is made by applying particular voltage levels to the A and B inputs of the multiplexers 104 and 106. Specifically, the multiplexer 104 switches its 1C0 and 2C0 inputs to its 1Y and 2Y outputs, respectively, when its A and B inputs are at low levels. When its A input is low and its B input is high, the multiplexer 104 switches its 1C1 and 2C1 inputs to its 1Y and 2Y outputs, respectively. When its A input is high and its B input is low, the multiplexer 104 switches its 1C2 and 2C2 inputs to its 1Y and 2Y outputs. When both its A and B inputs are high, the multiplexer 104 switches its 1C3 and 2C3 inputs to its 1Y and 2Y outputs. As shown, those 1C3 and 2C3 inputs are grounded, whereby the 1Y and 2Y outputs are zero, representing complete attenutation of the difference signal. The same combination of A and B inputs to the multiplexer 106 causes a corresponding switching of its inputs to its 1Y and 2Y outputs.

When the coefficient register 108 is clocked, its output terminals 110 provide a three bit coefficient to the divider 60 for attenuating the difference signal.

Figure 6:
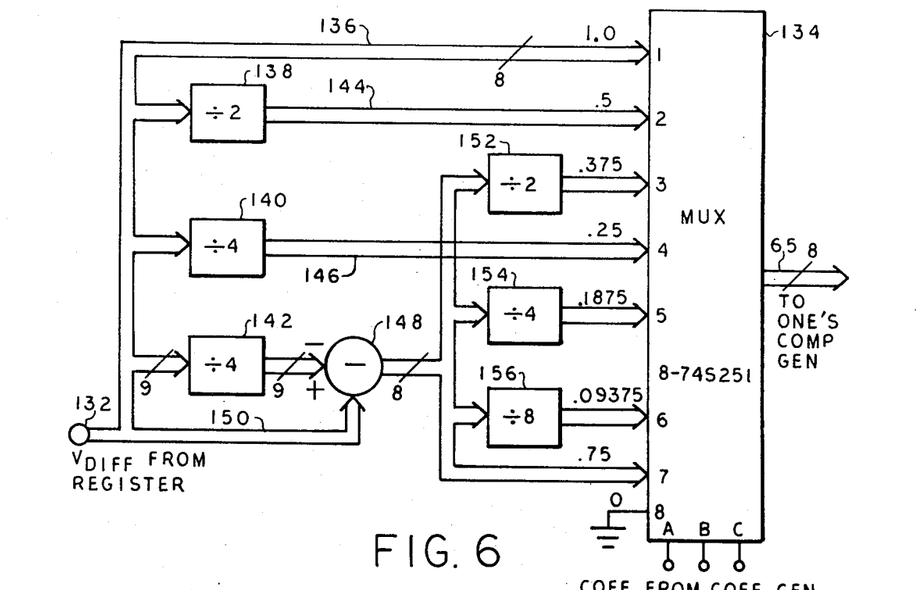
FIG. 6 illustrates a preferred structure for the divider illustrated in FIG. 2.

Turning now to FIG. 6, there is shown a preferred structure for effecting the function of the divider 60 shown in FIG. 2. The illustrated structure receives at terminal 132 the difference signal from the register 62 (FIG. 2). That difference signal is coupled directly to input 1 of a multiplexer 134 via a bus 136. Input 1 of the multiplexer and each of the inputs thereof numbered 2-eight each inlcude 8 input pins, one for each bit of received information.

The difference signal is also coupled to a divide-by-two circuit 138 and a pair of divide-by-four circuits 140 and 142. Bus 144 couples the output of the divider 138 (one half the amplitude of the difference signal) to input 2 of the multiplexer 134. A signal representative of one-fourth the amplitude of the difference signal is coupled from the divider 140 to input 4 of the multiplexer 134 via bus 146.

A subtracter 148 receives the full difference signal at its positive input via bus 150 and one-fourth the difference signal at its negative input from the divider 142. Hence, the output of the subtractor 148 is a signal representing three-fourths of the difference signal. That output is coupled to the inputs of a divide-by-two circuit 152, a divide-by-four circuit 154 and a divide-by-eight circuit 156. The outputs of the dividers 152, 154 and 156 are connected, respectively, to inputs 3, 5 and 6 of the multiplexer 134. Input 8 of the multiplexer is grounded to represent a zero level input of the difference signal. Hence, inputs 1-8 of the multiplexer 134 each receive a different value of the difference signal, ranging from a value of zero at input 8 to a value of one at input 1, with the indicated intermediate values at inputs 2-7.

To select which of its inputs to send to the adder 42 (FIG. 2) via bus 68, the multiplexer receives at inputs A, B and C a three bit coefficient from the coefficient generator 56. Referring to FIG. 5, the three bit coefficient is received from terminals 110 of the coefficient register 108. Accordingly, in response to a particular coefficient, the multiplexer 114 switches one of its inputs 1-8 to the output bus 65.

In the above-described embodiment of the divider 60, each divide-by-two circuit shifts the decimal point of its received signal left by one bit. Such shifting may be effected by a simple "hard wired" circuit which connects the Nth bit of input data to the N-1th bit of its multiplexer input. The divide-by-four circuits shift the Nth bit of input data to the N-2th bit of its multiplexer input. Likewise, the divide-by-eight circuit shifts the Nth bit of received data to the N-3th bit of its multiplexer input.

Figure 7:
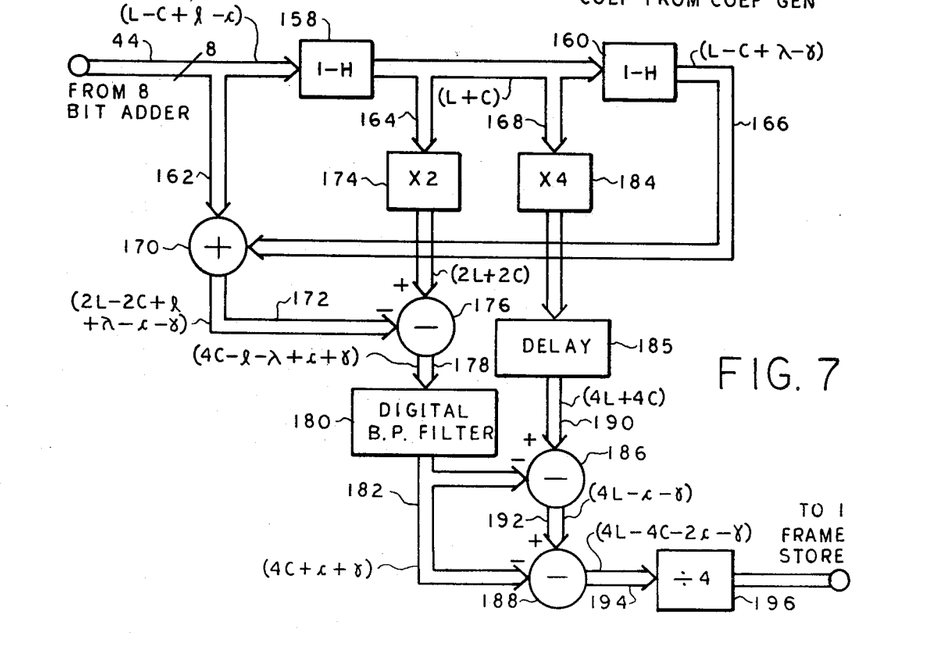
FIG. 7 illustrates a chroma inverter according to the invention for use with the filter shown in FIGS. 1 and 2.

FIG. 7 illustrates a preferred structure of the chroma inverter 30 of FIGS. 1 and 2. As mentioned before, its function is to separate the chroma component of a television signal from the luminance component, invert only the chroma component, and add the inverted chroma to the luminance so that the proper chroma phase is available for comparison with the incoming signal in the difference detector 18.

To achieve the functions described above, the inverter receives incoming video on bus 44 and transmits it through two serially coupled 1-H delay lines 158 and 160. Each of the delay lines 158 and 160 delays the received signal for an interval corresponding to the interval of one television line. Hence, at bus 162 is undelayed video having luminance and chroma components (L−C+1−c), where L indicates a luminance component, C indicates a chroma component, 1 indicates the difference in luminance components between the signal received by the delay line 158 and the signal at its output, and c indicates the difference in chroma components between the same two signals.

The delayed signal at the output of the delay line 158 appears on a bus 164 and is represented by luminance and chroma components (L+C), the chroma component of which is opposite in phase to the chroma component at the bus 44.

The signal at the output of the delay line 160 is twice delayed video having luminance and chroma components represented as $(L-C+\lambda-\gamma)$, where L and C are the non-varying luminance and chroma components, $\lambda$ indicates the difference in luminance components between the signal at the input to the delay line 160 and the signal at its output, and $\gamma$ indicates the difference in chroma components between the same two signals.

An additional bus 168 receives the once delayed video signal from the 1-H delay 158 for processing to be described below.

The chroma inverter includes an adder 170 coupled to busses 162 and 166 for combining the incoming video signal on bus 162 with the twice-delayed video on bus 166. The adder 170 combines its inputs to develop at bus 172 a signal corresponding to $(2L-2C+1+\lambda-c-\gamma)$.

To remove the luminance component (2L) of the signal on bus 172, the chroma inverter generates a multiple of the once-delayed video signal on the bus 164 for subtraction thereof from the signal on the bus 172. For this purpose, a times-two multiplier 174 receives the signal on bus 164, multiplies it by a factor of two, and applies the multiplied signal to a subtracter 176. The subtracter also receives the signal from the adder 170 via bus 172 and subtracts the latter signal from that received from the multiplier 174. Hence, the output of the subtracter 176 on bus 178 is a further signal which is substantially free of luminance components. As indicated in FIG. 7 that further signal comprises an inverted chroma component (4C) and the luminance and chroma differences, $-1-\lambda-\gamma+c$.

To remove the luminance difference components, the further signal on bus 178 is passed through a conventional digital bandpass filter 180 whose output at bus 182 is $(4C+c+\gamma)$.

In order to invert the signal at bus 182 and to recombine it with a luminance component, there is included a times-four multiplier 184, a delay device 185, and a pair of subtracters 186 and 188. The multiplier 184 receives and multiplies by four the once-delayed signal on bus 168 and couples that signal (4L+4C) via the delay device 185 and a bus 190 to one input of the subtracter 186, the other input thereto being the luminance-free signal $(4C+c+\gamma)$ on the bus 182. The delay device 185 compensates for other corresponding inherent delays to insure that both inputs to the subtracter 186 arrive there simultaneously. The subtracter 186 subtracts the signal on bus 182 from the signal on bus 190 to develop a signal indicated as $(4L-c-\gamma)$ on its output bus 192.

The subtracter 188 receives the signal on the bus 192 and that on the bus 182 for subtracting the latter from the former, whereby a signal corresponding to $(4L-4C-2c-2\gamma)$ is developed at the bus 194. Except for the latter signal being larger by a factor of four than necessary, it is in proper form for application to the one frame store 32 (FIGS. 1 and 2). The chroma difference components $(-(C/2)$ and $-(\gamma/2))$ appearing at the output of the divider 196 do not substantially affect the operation of the system.

To reduce the amplitude of the signal on bus 194, the latter signal is coupled to a divide-by-four circuit 196 and from there to the one frame store 32. By this arrangement, the output of the one frame store 32 is of the proper phase and amplitude for comparison with the incoming video signal by the difference detector 18.

In the embodiment shown in FIG. 7, the divider 196 may be merely a hard-wired network for shifting the binary point of the received digital information to the left as described previously. The multipliers may also be hard-wired to shift the binary point in the opposite direction.

The chroma inverter shown in FIG. 7 may be somewhat simplified to reduce the number of subtracters. For example, the subtracter 186 may be eliminated and a times-two mulitiplier may be inserted between the filter 180 and the subtracter 188. With this arrangement, the subtracter 188 receives the output of the delay device 185 and the multiplied output of the filter 180, and generates an output which is identical to the output as indicated in FIG. 7. Because the additional multiplier may be a hard-wired circuit replacing a more costly subtracter, some cost is saved with this modification.

The one frame store 32 shown in FIGS. 1 and 2 may be conventional. By way of example, it may be constructed of forty-eight F464 shift registers manufactured by Fairchild Semiconductor. The registers may be interconnected to form six parallel paths, with 65,536 eight bit words in each path. The six paths are arranged in an SPS (series-parallel-series) combination.

The noise filter described above may also be modified to receive and filter television-type signals which do not include a chroma component. For example, in the medical field, the output of an X-ray receiver is conventionally in the form of a television signal having black and white video components but no chroma component. This signal has typically been applied directly to a television monitor for viewing the results of an X-ray.

A problem with such conventional approaches is that the television signal generated by the X-ray receiver includes a substantial amount of random noise. Hence, the image produced by the monitor may be difficult to read and interpret.

Figure 8:
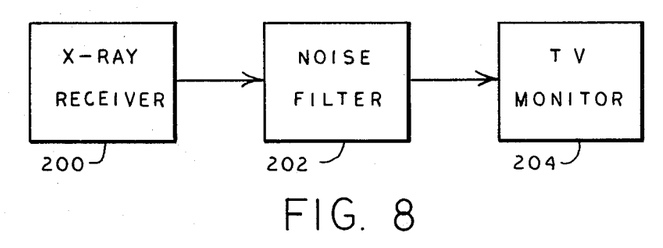
FIG. 8 illustrates another aspect of the invention wherein a modified noise filter processes the video output of an X-ray receiver.

To overcome this problem, an arrangement such as that shown in FIG. 8 may be employed. As shown, a conventional X-ray receiver 200 supplies a television signal, having only black and white video, to the input of a noise filter 202. The filter 202 is a modified form of the filter shown in FIG. 1 and supplies a filtered video signal to a television monitor 204. It has been found that this arrangement provides a television image from which random noise has been substantially eliminated.

Figure 9:
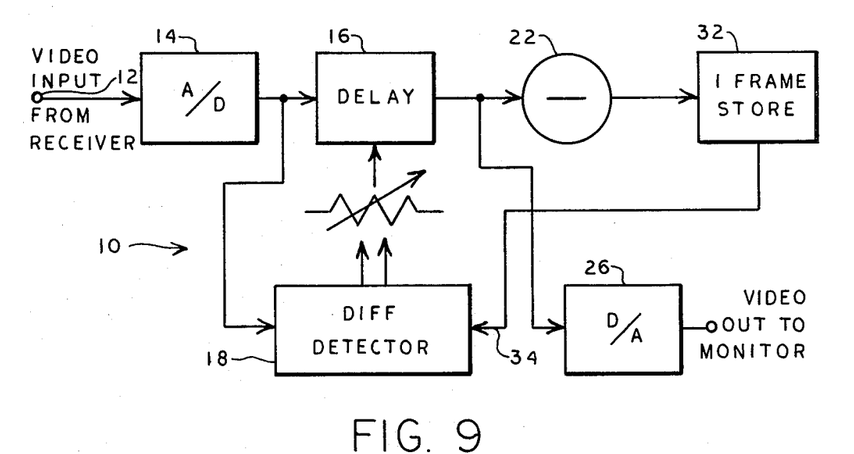
FIG. 9 shows the modified noise filter of FIG. 8 in block diagram form.

FIG. 9 illustrates, in block diagram form, the components of the noise filter 202. A comparison of FIGS. 1 and 9 reveals that the only difference between the modified noise filter 202 and the noise filter of FIG. 1 is that the chroma inverter has been eliminated. The output of the subtractor 22 is applied directly to the one frame store 32. In other respects, the components of the FIG. 9 filter and the filter of FIG. 1 may be identical, and the operation of the filter shown in FIG. 9 is the same as that of the filter shown in FIG. 1, excluding, of course, the operation of the chroma inverter.

The filter components shown in detail in FIGS. 2 through 6 may also be employed for the modified filter 202, except that the chroma inverter 30 of FIG. 2 is eliminated, and the lead 46 from the eight bit adder 42 is applied directly to the one frame store 32.

It will be appreciated that the modified noise filter shown in FIG. 9 may be used in applications other than the medical field. For example, in surveillance systems, the black and white video output of a surveillance camera may be applied to the modified noise filter, and the noise filter's output may be applied to one or more television monitors. Moreover, the modified noise filter may be employed in a wide variety of other applications where a black and white video signal is available, and where it is desirable to remove noise from the video signal.

Whether the filter of FIG. 1 or the filter of FIG. 9 is employed in a particular application, a very noise-free output signal is provided. The filtered output signal is at least comparable to those provided by more elaborate filters requiring two attenuators, and is not subject to certain distortions possible in the two-attenuator type filter.

Although the invention has been described in terms of specific preferred structure, it will be obvious to those skilled in the art that many alterations and modifications thereto may be made without departing from the invention. Accordingly, it is intended that all such modifications and alterations be included within the spirit and scope of the invention as defined by the appended claims.

What is claimed is:

1. A recursive filter for reducing noise in an incoming digitized, multi-bit television type signal having at least luminance components, comprising:
   subtracting means having first and second inputs and an output;
   means for applying the incoming television signal to the first input of said subtracting means without substantially attenuating the incoming signal;
   delay means coupled to the output of said subtracting means for developing a signal delayed by an interval substantially equal to a selected multiple of a television field interval;
   a motion detector receiving the incoming television signal and the delayed signal from said delay means for developing a difference signal representative of the differences between the incoming television signal and the delayed signal;
   an attenuator receiving the difference signal for selectively attenuating the same as a function of the amplitude of the difference signal; and
   means for coupling the attenuated difference signal to the second input of said subtracting means.

2. A filter as set forth in claim 1 wherein the incoming television type signal includes a chroma component, and further including an inverter coupled in series with said delay means for inverting only the chroma component of the incoming signal.

3. A filter as set forth in claim 2 wherein said delay means comprises a one frame storage device.

4. A filter as set forth in claim 1 wherein said attenuator includes a coefficient generator responsive to the amplitude of the difference signal for generating coefficients indicative of the factor by which the difference signal is to be attenuated, and a divider responsive to said coefficients for dividing the difference signal by the indicated factor.

5. A filter as set forth in claim 4 wherein said motion detector includes first and second subtracters receiving the unattenuated television signal and the delayed signal, said first subtracter being adapted to generate a signal representative of the positive difference between said received signals, said second subtracter being adapted to generate a signal representative of the negative difference between said received signals, and a multiplexer receiving said positive and negative difference signals for generating an output indicative of the absolute value of the difference signal, and wherein said coefficient generator is responsive to the absolute value of the difference signal.

6. A filter as set forth in claim 5 wherein said coefficient generator includes a memory for storing, at given memory locations, selected digital values for the coefficients, means for detecting when the absolute value of the difference signal exceeds a predetermined value, means for accessing particular digital values from memory dependent on the absolute value of the difference signal, and means for accessing a digital value indicative of zero attenuation in response to the detection of the difference signal being in excess of the predetermined value.

7. A filter as set forth in claim 1 wherein said coupling means includes an additional subtracter receiving the difference signal and the attenuated difference signal for generating an output indicative of the difference therebetween, and means for coupling the latter output to the second input of said subtracting means.

8. A filter as set forth in claim 2 wherein said inverter receives an input video signal containing luminance and chroma components and includes:
   means for generating a first video signal delayed from the input video signal by an interval corresponding to one television line interval and for generating a second video signal delayed from the input video signal by an interval corresponding to two television line intervals;
   an adder for combining the input video signal with the second delayed video signal and for generating an output corresponding to the combination;
   means for generating a selected multiple of said first delayed video signal;
   means receiving the output of said adder and the selected multiple of the first delayed video signal for subtracting the output of said adder from the multiple of the first delayed video signal so as to generate a further signal substantially free of luminance components; and
   means for inverting said further signal and for combining it with a selected multiple of the luminance component of the first delayed video signal to generate a final video signal containing a luminance component and a chroma component.

9. A filter as set forth in claim 8 wherein said selected multiple is equal to two.

10. A filter as set forth in claim 9 wherein said inverting and combining means includes a multiplier for multiplying the first delayed video signal by a factor of four, a first subtracter for subtracting said further signal from the output of said multiplier, a second subtracter for subtracting said further signal from the output of said first subtracter, and a divider for dividing the output of said second subtracter by four.

11. A recursive filter for reducing noise in an incoming digitized, multi-bit television signal having at least luminance components, comprising:
   subtracting means having first and second inputs and an output;
   means for applying the incoming unattenuated television signal to the first input of said subtracting means;

a one frame storage device coupled to the output of said subtracting means for developing a frame-delayed video signal;

a motion detector receiving the frame-delayed video signal from said frame storage device and the incoming television signal for generating a first output corresponding to the difference between the inputs to the difference detector and a second output corresponding to the absolute value of the first output;

a coefficient generator responsive to said second output from said motion detector for generating coefficients indicative of a factor by which he difference signal is to be attenuated;

a divider responsive to the difference signal and the coefficients for dividing the difference signal to provide an attenuated difference signal; and means for coupling the attenuated difference signal to the second input of said subtracting means.

12. A filter as set forth in claim 11 wherein the incoming television-type signal includes a chroma component, and further including a chroma inverter coupling the output of the subtracting means to the one frame storage device, said inverter including:

means receiving the output of said subtracting means for generating a first video signal delayed from said output by an interval corresponding to one television line interval and for generating a second video signal delayed from said output by an interval corresponding to two television line intervals;

an adder for combining the output from said subtracting means with the second delayed video signal and for generating an output corresponding to the combination;

means for multiplying the first delayed video signal by a factor of two;

means receiving the output of said adder and the output of said multiplier for subtracting the former from the latter so as to generate a further signal substantially free of luminance components; and means for inverting said further signal and for combining it with a selected multiple of the luminance component of the first delayed video signal to generate a final video signal containing a luminance component and a chroma component.

13. A filter as set forth in claim 12 further including a digital bandpass filter receiving the further signal from said subtracting means for removing residual luminance components from the further signal.

14. A filter as set forth in claim 13 wherein said coupling means includes an additional subtracter receiving the difference signal and the attenuated difference signal for generating an output indicative of the difference therebetween, and means for coupling the latter output to the second input of said subtracting means.

* * * * *

UNITED STATES PATENT AND TRADEMARK OFFICE
CERTIFICATE OF CORRECTION

PATENT NO. : 4,291,333

DATED : September 22, 1981

INVENTOR(S) : Richard B. Warnock and John A. Briggs

It is certified that error appears in the above-identified patent and that said Letters Patent are hereby corrected as shown below:

Column 4, line 29, after "as", change "$V_i-(1/K1(V_i-V_{i-1})$ to "$V_i-\frac{1}{K1}(V_i-V_{i-1})$";

Column 5, line 13, correct the spelling of "generator";

Column 8, line 6, change "2-eight" to -- 2-8 --; and

Column 13, Claim 11, line 13, "he" should read -- the --.

Signed and Sealed this

Thirteenth Day of April 1982

[SEAL]

Attest:

Attesting Officer

GERALD J. MOSSINGHOFF

Commissioner of Patents and Trademarks